Dec. 6, 1966   J. E. E. SAMAIN   3,289,530
METHOD AND APPARATUS FOR PREPARING MICROFILE RECORDS
Filed April 27, 1964   4 Sheets-Sheet 1

INVENTOR.
JACQUES EMILE EVARISTE SAMAIN
By
agent

Dec. 6, 1966  J. E. E. SAMAIN  3,289,530
METHOD AND APPARATUS FOR PREPARING MICROFILE RECORDS
Filed April 27, 1964  4 Sheets-Sheet 2

INVENTOR.
JACQUES EMILE EVARISTE SAMAIN
By
agent

Dec. 6, 1966        J. E. E. SAMAIN        3,289,530

METHOD AND APPARATUS FOR PREPARING MICROFILE RECORDS

Filed April 27, 1964        4 Sheets-Sheet 4

INVENTOR.
JACQUES EMILE EVARISTE SAMAIN

United States Patent Office 3,289,530
Patented Dec. 6, 1966

3,289,530
METHOD AND APPARATUS FOR PREPARING MICROFILE RECORDS
Jacques Emile Evariste Samain, 74 Rue des Saints-Peres, Paris, France
Filed Apr. 27, 1964, Ser. No. 362,849
Claims priority, application France, May 8, 1963, 934,080
2 Claims. (Cl. 88—24)

This invention relates to a method of preparing microfile records, and to apparatus for performing the method.

In its more specific aspects, the invention is concerned with microfile records which include visual information reduced to a size that permits storage in a very small space but requires enlargement for reading as well as well as visual information readily evaluated by the naked eye or by automatic scanning devices.

The method employed for preparing such records basically consists in simultaneously viewing two separate information carriers, and of projecting images of the viewed information carries on different portions of a light sensitive image carrier. One of the images is of reduced size. The respective ratios between corresponding dimensions of the information carriers and of their images differ so that one portion of the viewed information is compressed into a very small space and not normally accessible to the naked eye, whereas the other information may be read or automatically scanned for sorting.

The term "information," as employed in the specification and claims, will be understood to relate to any fact or thought reproduced or reproducible by means of the printer's art. It is thus not necessarily limited to an arrangement of letters, but also includes pictorial material.

The microfile records of the invention may in turn be reproduced photographically or otherwise, and the information contained in a plurality of individual records may be combined on a single carrier to provide a synoptic presentation of items of related subject matter.

The invention also is concerned with apparatus for carrying out the method, and for photographically preparing microfile records of the invention. In one of its aspects, the invention, therefore, resides in a camera arrangement which includes a support having a base member. The base member defines a plane of contact, and is pervious to light directed to and emitted from said plane. A bracket on the support is adapted to hold an object to be photographed in a predetermined plane. A camera having a housing, two lenses and a conventional film transporting mechanism in the housing is mounted on the support. The lenses are simultaneously focused on the same film portion. The lenses differ in the respective ratios between the size of viewed objects and the size of the projected images of the objects. One of the lenses is trained on the aforementioned predetermined plane and the other lens is trained on the contact plane of the base member.

Other features and many of the attendant advantages of this invention will become apparent from the following detailed description of preferred embodiments when considered in conjunction with the attached drawing in which.

Figure 1:
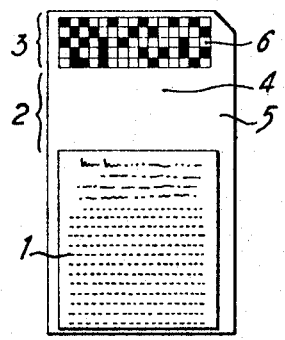
FIG. 1 is a plan view of a microfile record of the invention.

Referring now to the drawing, and initially to FIG. 1, there is seen a microfile card on which information is recorded in three distinct zones 1, 2 and 3. Zone 1 carries a photographically reproduced written or printed text or pictorial matter reduced in size to the extent that it cannot normally be read with the naked eye and, therefore, conveying much information in a very small space.

The zone 2 of the card carries lettering of sufficient size to be read easily. The lettering is arranged in two lines. Line 4 carries a key word indicative of the classification of the information in zone 1. Line 5 carries code letters which may provide cross referencing information, and further classify the information of zone 1 in a manner more detailed than is possible by means of a keyword.

The zone 3 carries a message 6 in a binary code of black and white or transparent squares arranged in five lines and fifteen columns. The message 6 is capable of being scanned by conventional sorting machinery for retrieval of microfile cards dealing with a specific subject from a large stack of cards. If a bit of information requires five binary signals, it is evident that each line of the message 6 can convey three bits of information, and that the message in zone 1 may be more detailed than one capable of being conveyed by the code letters in zone 2.

Figure 2:
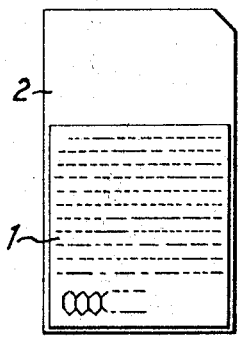
FIG. 2 shows another microfile record of the invention in plan view.

Depending on the sorting equipment available, one may omit either zone 2 or zone 3 from the microfile cards. FIG. 2 shows a card which differs from that shown in FIG. 1 by the absence of the binary code message. The information available without magnification consists of legible lettering in a zone 2', whereas the zone 1' is occupied by reading matter on a microscopic scale.

Figure 3:
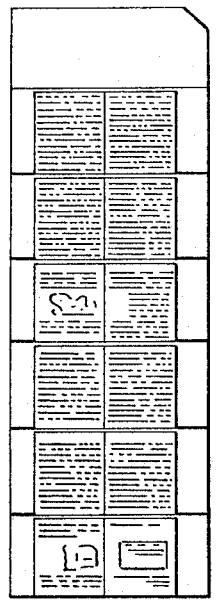
FIG. 3 is a plan view of yet another microfile record of the invention.

The contents of several cards of the size illustrated in FIGS 1 and 2 may be combined on a larger card under a single heading 4' and under common code characters 5', as shown in FIG. 3. The information 1a on a microscopic scale is arranged in two long columns.

Figure 4:
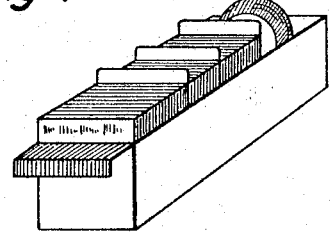
FIG. 4 illustrates a card file holding the records of the invention, in perspective view.
Figure 5:
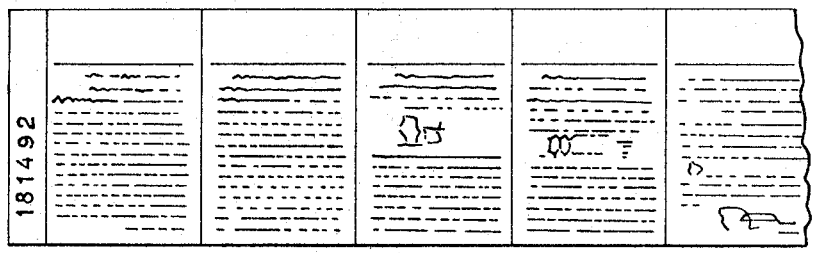
FIG. 5 shows a photographic print combining the contents of several records of the type shown in FIG. 2.
Figure 6:
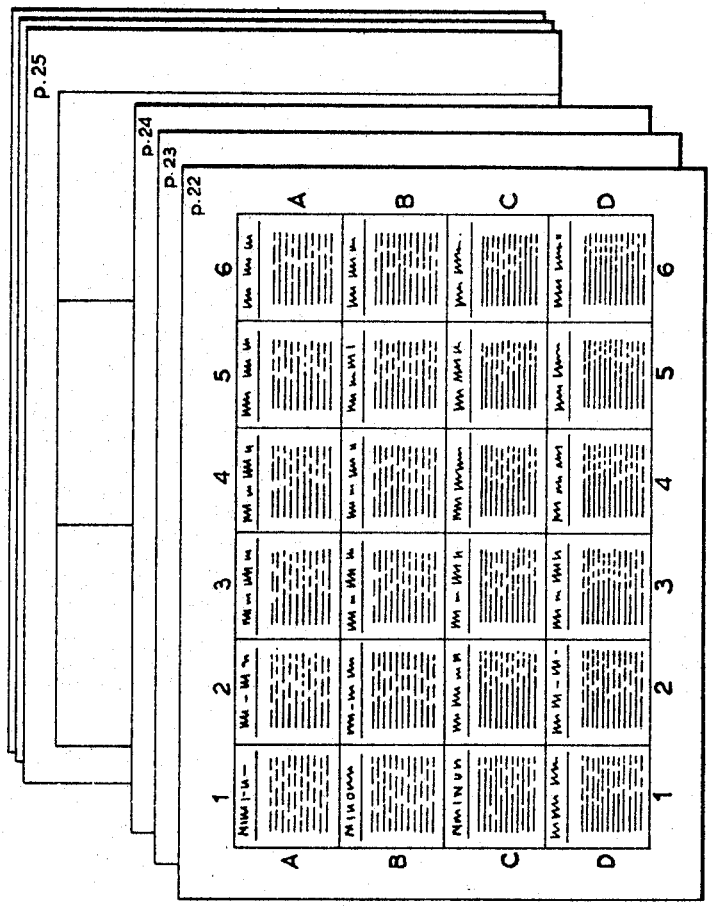
FIG. 6 shows cards presenting a synoptic view of a plurality of records of the invention.

The microfile cards of the invention are preferably stored for permanent use in trays 7 provided with suitably lettered dividers 8, as is shown in FIG. 4. If it is desired to present the related contents of a plurality of microfile cards, they may be reproduced in a conventional manner on paper or film strips as shown in FIG. 5. The illustrated strip carries the juxtaposed information of several cards of the type shown in FIG. 2, and a common identifying number 9. The large cards illustrated in FIG. 6 carry the information of twenty-four cards of the type of FIG. 2 in a checkerboard arrangement. Marginal index marks 10 facilitate location of specific items of information.

Figure 7:
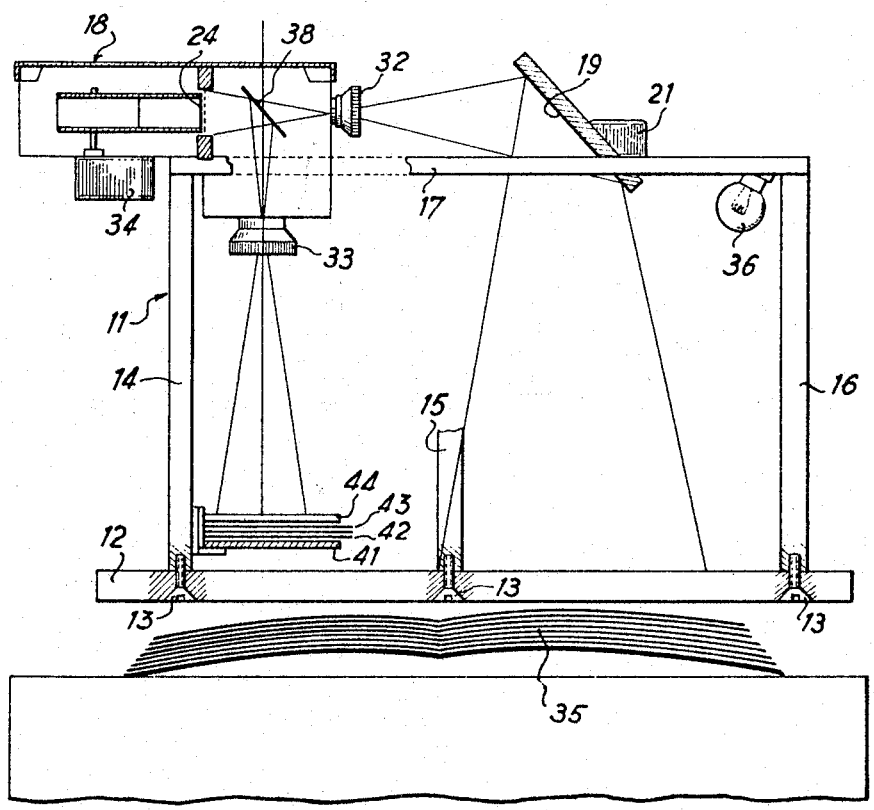
FIG. 7 is a sectional, elevational view of a camera arrangement for producing the microfile records of FIGS. 1 to 3.
Figure 8:
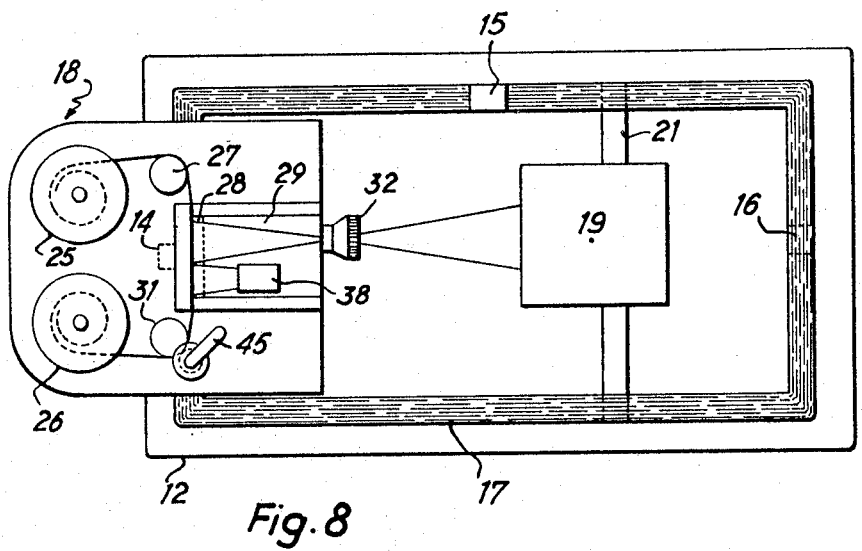
FIG. 8 shows the camera arrangement of FIG. 7 in plan view, without the light-tight top cover of the camera.
Figure 9:
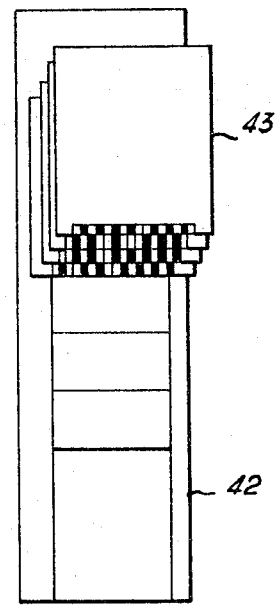
FIG. 9 shows a detail of the apparatus of FIG. 7 in plan view.

Apparatus suitable for producing the primary microfile records shown in FIGS. 1 and 2 is illustrated in FIGS. 7 to 9. Referring initially to FIG. 7, there is seen a supporting structure 11 which essentially consists of a base plate 12, a horizontal top frame 17 and several uprights 14, 15, 16 which connect the base plate and the top frame. The base plate is a heavy sheet of glass. The uprights are joined to the base plate by countersunk screws 13 and the top frame is attached to the uprights by similar rigid connections, not specifically illustrated. A camera 18 is mounted on one end of the frame 17 and a plane mirror 19 is mounted near the other end of the frame on a cross member 21. The principal optical axis of the camera is horizontal in the illustrated normal operating position of the apparatus. The mirror 19 intersects the principal camera axis at 450°.

The camera 18 is equipped with a transport mechanism for a light sensitive film 24, better seen in FIG. 8. The mechanism, largely conventional in itself, includes a supply spool 25 and a film receiving spool 26. The film drawn from the supply spool is guided by a guide roll 27 into an exposure position adjacent a gate 28 at the rear wall of a chamber 29. The exposed film passes over a rubber-coated drive roller 31 which is actuated by a crank 34, and is then wound on the receiving spool 26.

Reverting to FIG. 7, it is seen that the camera 18 is equipped with two lenses 32, 33. The optical axis of the principal lens 32 is horizontal and perpendicular to the plane of the film 24 in the gate assembly 28. The axis of the auxiliary lens 33 is vertical and parallel to the last-mentioned plane. The two axes extend in parallel vertical planes which are horizontally spaced from each other.

The bottom face of the plate 12 is superimposed on a book 35. While the book has been shown in the position it assumes when opened, it will be appreciated that it is normally flattened against the plane of contact defined by the underside of the plate 12 by the weight of the camera arrangement. The book is lighted through the plate 12 by an array of electric lamps 36 on the supporting structure 11 of which only one is shown in FIG. 7.

A mirror 38 is arranged in the chamber 29 to intersect the optical axis of the lens 33, but is laterally offset from the optical axis of the lens 32, as better seen in FIG. 8. The mirror 38 projects the image of an object viewed by the lens 33 on a portion of the film 24 at the gate 28.

A bracket 41 mounted on the upright 14 supports carriers of information to be combined with the information viewed in the book 35 by the lens 32 through the mirror 19. The information carriers on the bracket 41 are better seen in the plan view of FIG. 9. They include a paper strip 42, and a stack of thin cards 43. The strip 42 and the cards 43 are held substantially in a common plane by a heavy glass pressure plate 44. As seen in FIG. 9, the strip 42 sequentially carries a plurality of keywords 4 and the associated code letters 5. The margins of the cards 43 carry rows of black and white squares corresponding to the lines of the binary code message 6 shown in FIG. 1.

The lenses 32, 33 differ greatly in focal length. The focal length of the principal lens 32 is selected in such a manner that the information presented by the book 35 at the contact plane of the plate 12 is reduced in size to 1/5 to 1/20 in the image projected on the film 24. The information jointly presented by the strip 42 and the cards 43 in a plane practically defined by the underside of the pressure plate 43 is projected on the film 24 as an image reduced in size in a ratio of 2:3. It will be appreciated, therefore, that a dimension of a photographed object corresponding to a certain angular spacing of rays incident on the lenses 32, 33 is much smaller in the image projected by the lens 32 than in that projected by the lens 33.

Because the optical axes of the two lenses are horizontally spaced from each other, the images projected by the lenses are juxtaposed on the same frame of the film 24. To avoid overlapping of marginal portions of the images, masks will normally be attached to the glass plates 12 and 44 in a manner conventional in itself, and not shown in the drawing. The mask of the plate 44 also limits the view of the lens 33 to a single keyword 4 and to a single line of code letters 5 on the strip 42.

It will be understood that the camera 38 also is equipped with a single conventional focal plane shutter on the gate assembly 28 or with individual shutters built into the lenses 32, 33, not shown. If two shutters are employed, they are preferably coupled for simultaneous exposure. The shutter mechanism or mechanisms are connected in a known manner to the crank 34 for simultaneous shutter cocking and film advance.

The exposed film 24 is removed from the camera housing with the necessary precautions, and the latent image fromed is developed in the usual manner. Each frame of the negative so obtained contains microscopically reduced information from the book 35 juxtaposed to the appropriate keyword and code designations. Cards may then be printed from the negative film in any desired manner.

The method of the invention provides information compressed in a very small space, yet readily sorted visually or by known automatic equipment.

It should be understood of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A camera arrangement comprising, in combination:
 (a) a support including a base member having a contact face;
 (b) bracket means on said support for holding an object to be photographed in a predetermined plane; and
 (c) a camera mounted on said support, said camera including
  (1) a housing,
  (2) film transporting means in said housing for sequentially moving longitudinal portions of a film toward and away from a predetermined position in a predetermined direction, and
  (3) two lenses mounted on said housing and simultaneously focused on respective portions of said film in said position, said portions being spaced in said direction, whereby respective images of objects viewed by said lenses are simultaneously projected on said film portions,
  (4) said lenses differing in the respective ratios between the size of a viewed object and the size of the projected image of the object,
  (5) one of said lenses being trained on an object held by said bracket means, and
  (6) the other lens being trained on said contact face of said base member.
2. A method of preparing a record which comprises:
 (a) sequentially lighting respective portions of two information carriers;
 (b) projecting an image of reduced size of each portion of one of the lighted information carriers on respective first portions of a light-sensitive image carrier;
 (c) projecting an image of each portion of the other lighted information carrier on respective second portions of said image carrier simultaneously with the projecting of an image of an associated portion of said one information carrier, the ratio between corresponding dimensions of said one information carrier and of the images thereof being smaller than the ratio between corresponding dimensions of said other information carrier and the image of the latter, said image carrier responding to the projected images by forming latent images of the projected images;

(d) developing said latent images into visible images; and (e) transferring to a common carrier the visible images developed from a plurality of latent images formed on respective first and second portions of said image carrier by simultaneous projection.

References Cited by the Examiner

UNITED STATES PATENTS 2,796,812  6/1957  Koci _____ 88—24 X
3,202,045  8/1965  Arsenault et al. _____ 88—24

NORTON ANSHER, *Primary Examiner.*

R. A. WINTERCORN, *Assistant Examiner.*